United States Patent

[11] 3,630,710

| [72] | Inventor | Arman F. Frederickson<br>Englewood, Colo. |
|---|---|---|
| [21] | Appl. No. | 795,456 |
| [22] | Filed | Jan. 31, 1969 |
| [45] | Patented | Dec. 28, 1971 |
| [73] | Assignee | Mary Maxine Frederickson<br>Houston, Tex.<br>Continuation-in-part of application Ser. No. 575,710, Aug. 29, 1966, now abandoned. This application Jan. 31, 1969, Ser. No. 795,456 |

[54] PRODUCTION OF METABOLIC DEMAND SEAWEED-TYPE FERTILIZER
4 Claims, 4 Drawing Figs.

[52] U.S. Cl. .................................................. 71/23, 71/24, 71/25, 71/33
[51] Int. Cl. ........................................................ C05f 11/00, C05f 11/02
[50] Field of Search ......................................... 71/23, 24

[56] References Cited
UNITED STATES PATENTS

| 103,085 | 5/1870 | Ruggles .................... | 71/24 X |
| 2,877,599 | 3/1959 | Hebestreet et al. .......... | 71/24 X |
| 2,912,317 | 11/1959 | Gloss ......................... | 71/24 |
| 2,027,766 | 1/1936 | Davis et al. ................. | 71/24 |
| 3,146,087 | 8/1964 | Formaini et al. ............. | 71/23 |

FOREIGN PATENTS

| 347,641 | 4/1931 | Great Britain ............... | 71/24 |
| 424,260 | 2/1935 | Great Britain ............... | 71/24 |

Primary Examiner—Samih N. Zaharna
Assistant Examiner—Bennett H. Levenson
Attorney—March, Le Fever & Wyatt

ABSTRACT: A metabolic demand nitrogenous fertilizer or fertilizer base which releases nutrients into the soil in a controlled manner and in response to soil deficiencies is prepared by a process comprising the partial oxidation of organic materials at carefully controlled conditions of time, temperature and supplies of an oxidizing gas in a fluidized zone. Starting materials for the process include coal, bituminous or anthracitic, peat-moss, high chlorophyll content organic materials such as seaweeds, grasses, plant tops such as potato plant tops, sugar beet tops, and the like, seaweeds being a particularly effective type of material treated.

Nitrogen, potassium, phosphorous, and sulfate values may be added to the partially oxidized organic materials by reaction with the corresponding element supplying materials.

PATENTED DEC28 1971 3,630,710

INVENTOR.
ARMAN F. FREDERICKSON by
March, LeFever & Wyatt
ATTORNEYS

INVENTOR.
ARMAN F. FREDERICKSON by
March, LeFever & Wyatt
ATTORNEYS

PRODUCTION OF METABOLIC DEMAND SEAWEED-TYPE FERTILIZER

This case is a continuation-in-part of Ser. No. 575,710, filed Aug. 29, 1966 for the same inventor, and now abandoned.

This invention relates to organic base, nitrogeneous, controlled nutrient-release, metabolic demand fertilizers and fertilizer bases, and to a method of producing such a fertilizer from naturally occurring organic materials.

Among the objects of this invention are to provide a novel organic fertilizer base; to provide such a fertilizer base which contains the nitrogen values of naturally occurring organic matter in a form usable as a nutrient by plants; to provide such a base which can be used as an absorbent by itself to purify water and for other purposes; to provide such a base which can be reacted with phosphate and potassium materials to produce a general purpose or specialty fertilizer, such as containing the essential plant nutrients, namely, nitrogen, phosphorus and potassium, along with a family of trace elements; to provide such a fertilizer which will release its nutrients on solution and decomposition in a manner which is responsive to the demand for such nutrients and which enhances the passage of such nutrients to plant roots; to provide such a fertilizer which makes possible the cyclic buildup of nitrogen values available to plants; to provide such a fertilizer which can be used over a wider range of climatic conditions than can ordinary soluble fertilizers; to provide such a fertilizer which is efficient and effective in use; to provide a novel method for producing an organic base, nitrogenous fertilizer; to provide such a method which simultaneously preserves the organic and other carbonaceous values; to provide such a method which produces a nitrogenous-organic fertilizer base from coal, petroleum asphaltenes, peat moss, seaweeds, grasses, plant tops, or the like; to provide such a method which is economical and efficient; to provide such a method by which additional plant nutrients may be added with ease; and to provide such a method which is readily carried out and is economically efficient in operation.

Local, excessive concentrations of water-soluble fertilizers near plant roots can produce severe crop damage. Plant rootlets are very sensitive to saline solution having a concentration above a certain limit called "isotonic strength." Solutions of greater strength, wetting the roots, will commonly wilt or kill the plant. For this reason, great care and considerable skill is needed to add the correct amount of water-soluble fertilizer to soils without causing damage to the plants.

A major feature of the fertilizer or fertilizer base of this invention is the manner in which it releases its nutrients on solution and decomposition. The controlled release of the novel fertilizer of this invention is slower than that of completely water-soluble fertilizers and, hence, large concentrations are less likely to cause crop damage.

It is known to be essential that if a soil is to maintain a high level of productivity and control erosion by maintaining the physical properties of the soil, one must:

1. Restore organic matter having an appropriate carbon to nitrogen ratio to the soil, along with
2. Calcium, phosphorus, potash and other mineral nutrients in a form where they are progressively available as required by the plants without appreciable loss by flushing during heavy rain.
3. In warmer climates, a more stable form of organic matter is desirable, which will decay at a slow rate than natural soil organic matter, hence, the organic content of a soil can be maintained or restored to depleted soils.

The fertilizer of this invention meets all of the above requirements; therefore, is a uniquely balanced type of fertilizer which can be used over a wider range of climatic conditions than can ordinary soluble fertilizers.

This invention provides a new type of fertilizer which adds both nitrogen to the soil and also large quantities of organic matter. The form in which the nitrogen is added is more closely akin to the natural humus occurring in soils than are the conventional soluble fertilizers now used so widely throughout the world. This new fertilizer has a portion of the nitrogen available for plant use and also a portion tied up by various combinations with the organic humic acids originating from the organic base from which the fertilizer is made. In this way, the fertilizer of this invention meets the immediate needs of the plants and also remains in the soil as a soil conditioner to maintain the physical properties of the soil. Because the fertilizer of this invention is more stable than the natural humic acids, it remains in the soil much longer than ordinary humus and, therefore, is a very valuable addition that will enable the soil not only to sustain plants for a longer period of time, but also maintain its physical properties, so that its moisture content and nutrient-supplying ability will remain over several cropping years.

A fertilizer base of this invention comprises a nitrogen-enriched partially oxidized organic material desirably having additional nutrients, such as phosphate, potassium, sulfates and the like. The fertilizer may be produced by a process wherein the same or same type of material, may be partially oxidized to produce a product rich in humic acid or humates and charred or coked by heating to drive off ammonia gas or other nitrogenous products which will react with the partially oxidized organic material, apparently the humic acid thereof, to produce a stable nitrogen enrichment.

The accompanying drawings are useful in understanding the process of the invention. In the drawings

In practicing the instant invention, it has been found that a fluidized bed-type reactor is an especially suitable reactor in which the controlled oxidation of organic materials can be conducted. The process of the invention consists of feeding the organic substance to a fluidized bed-type reactor while simultaneously introducing air or oxygen-containing gases at the desired temperatures at or near the bottom of the reactor to thereby fluidize the same. This procedure causes the heated oxygen-containing gases to move upwards while the charge of organic substances moves downwards through a drying zone in which water is removed and then on downwards through the partial oxidation zone where the organic substance, is rendered acidic and its nitrogen content fixed. The partially oxidized material, as discharged from the reactor, then constitutes the fertilizer base with which other suitable ingredients may be mixed to enhance nutrient values, or reacted with ammonia gas in the presence of water or water vapor to further enrich nitrogen values. Also, if soil conditions so require, and are of a suitable composition for the slow release of plant nutrients in the presence of the partially oxidized material, the partially oxidized product may be added directly to the soil to thus take advantage of the slow release of nutrients already in the soil and the nitrogen already fixed in the organic base produced by the partial oxidation process.

Those skilled in the art will appreciate that there are a number of variations as to the most convenient utilization of the partially oxidized product, such variations being dictated by the availability of other fertilizers such as potash and phosphate and by the availability of plant nutrients such as iron, molybdenum, cobalt, copper, zinc, manganese, boron, iodine, sulfur and magnesium and economic considerations.

The fertilizers and fertilizer bases of this invention are prepared by the partial oxidation, under carefully controlled conditions, of organic materials which are naturally occurring. One such class of materials are the energy-producing materials which are readily available in locales which have a need for soil conditioning. This class of materials includes such substances as coals, brown coal, bituminous coal, anthracite coal, asphaltenes from crude oil refining, or those naturally occurring, and the like. The other broad class of raw materials useful as starting materials for the fertilizers of this invention are the class of high chlorophyll-containing materials such as seaweeds, grasses, plant tops such as sugar beet tops, potato plant tops, etc. Other materials, such as industrial wastes exemplified by sugar cane bagasse, spent coffee grounds, wheat straws, corn stalks, and the like, may be used to partially oxidize into the nitrogenous metabolic demand fertilizers of the invention.

Because of their ready availability in areas of the world which have demonstrated a great need for soil conditioning and fertilization, the group of chlorophyll-containing seaweeds are particularly useful.

Of particular interest are those chlorophyll-containing seaweeds—or seaplants—grouped in the phyla Rhodophyta or Red Seaplants or Phaeophyta, or Brown Seaplants.

These seaweed materials grow in abundance off the coasts of North and South America, Japan, Europe, Australia and South Africa and viable industries for their harvest presently exist. In some instances, species of these phyla are harvested for their colloid content. The seaweed is harvested, sun dried—and sun bleached—baled, shipped to processing plants and the desired colloids are removed by various processing steps which usually involve extraction with an aqueous medium.

Some of the more common colloids and their seaweed sources are listed in the table below:

TABLE I

COMMON SEAWEED COLLOIDS

AND THEIR SOURCES

| Colloid | Sea Weed Source | Locale (Coasts of) |
| --- | --- | --- |
| Agar | *Gelidium amansii* | Japan, California, |
|  | *Gelidium cartilagineum* | North Carolina, Mexico, Spain, Portugal, Australia, South Africa |
| Algin | *Macrocystis pyrafera* | North and South |
|  | *Laminaria digitata* | America, Norway, |
|  | *Laminaria saccharina* | Great Britain, |
|  | *Laminaria cloustina* | Japan |
| Carrageenin | (Irish Mosses) | New England, |
|  | *Chondrus crispus* | Canada, Great Britain, |
|  | *Gigartina mammillosa* | France |

Since seaweed processing usually involves cleaning and fine comminution of the dried material prior to colloid extraction, the processed material, which is ordinarily a disposal problem, is an excellent starting material for the instant process. However the harvested and dried seaweed may also be used directly—in this instance, comminution being required prior to the partial oxidation step.

It is to be understood that operating variables in the inventive process may vary depending upon the particular starting material chosen. Set out below in tabular form, however, are the operable and preferred operating conditions for the practice of the invention using the preferred starting materials, coal and seaweed.

Figure 2:
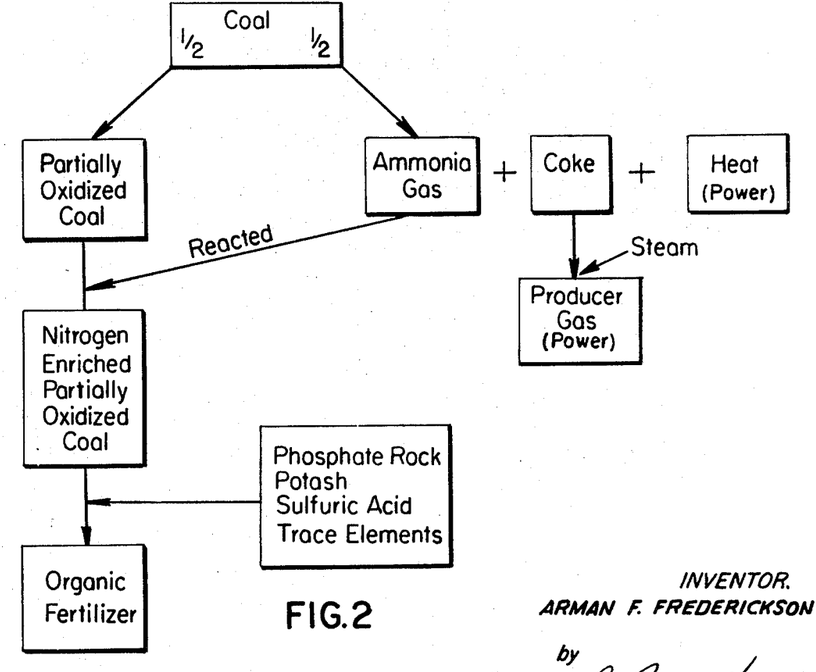
FIG. 2 diagrams an embodiment of the process wherein one portion of the starting material is utilized to provide energy and nutrient enhancement materials for the other portion.

Methods and procedures for the partial oxidation of carbonaceous matter to convert all, or a substantial portion of the organic matter therein, to humic acids and humates while retaining the original nitrogen values of the base material are known. However, it was unexpectedly found that if a carbonaceous base containing nitrogen is partially oxidized to retain the nitrogen values and form humic acids and humic materials originally present in the carbonaceous base or resulting from the oxidation reaction, the resulting partially oxidized matter becomes a powerful absorbent or reactant for the ammonia ion, other gases and related basic compounds from an aqueous slurry. Even more specifically, it was discovered that an oxidized organic material in the presence of water, or water vapor, will react chemically with ammonia or other nitrogenous products being evolved during the carbonization operation on another sample of the same material, the nitrogen content of the organic-base fertilizer thus being upgraded. Thus, by using the heat values and gases resulting from carbonizing one sample of material to oxidize another sample of the same material, while simultaneously reacting or absorbing the ammonia, other nitrogen-containing compounds and certain other gases evolving from the carbonization operation, into the humic acid and humates and other acid values formed during the oxidation of the organic material, a nitrogen-enriched organic fertilizer base is produced. This is shown schematically in FIG. 2 and is illustrated by the following examples; wherein a bituminous coal is used as a starting material.

EXAMPLE 1

One hundred grams of high volatile bituminous coal from Routt County, Colorado, −65 to +100 mesh, were placed in a fluidized bed reactor and maintained at a temperature of 205° C. while simultaneously passing air through the reactor to partially oxidize the coal and fluidize the bed. The initial nitrogen content of the nonoxidized raw coal, on a water-free basis, was determined to be 1.73 percent. Following the oxidation period, the nitrogen content of the oxidized coal was determined to be 1.76 percent. However, when the oxidized coal was treated with aqueous ammonia, the humic acids and other acid values formed during the oxidation step were neutralized by the ammonia. Following the ammoniation period, the nitrogen content of the oxidized coal was determined to be 5.64 percent on a water-free basis, which corresponds to a 325 percent increase in the original nitrogen content of the coal.

EXAMPLE 2

Two hundred grams of the Routt County coal, −35+48 mesh, were charged to a small stainless steel vessel. The vessel was heated in a laboratory electric-resistance muffle. The temperature of the coal was raised from 700° F. to a maximum of 1,800° F. over a 3-hour period. A thermocouple inserted into the vessel measured the coal temperature. Water and oil from the operation were condensed in an initial trap; a light-oil scrubber removed essentially all of the remaining condensable vapors; the gas flow was split at this point, and ammonia was absorbed into two oxidized coal-water slurries; noncondensable gases were vented from the absorber. Upon completion of the carbonization operation, the coal-water slurry was evaporated to dryness and the coal analyzed by the Kjeldahl method for nitrogen. As a basis for comparison, the oxidized

TABLE II

|  | Operable | | Preferred | |
| --- | --- | --- | --- | --- |
|  | Coal | Seaweed | Coal | Seaweed |
| Particle size (mesh) | −48+425 | −48+425 | −65+150 | −65+150 |
| Fluidizing gas: | | | | |
| Temperature (° F.) | 80–500 | 300–450 | 80–450 | 400–450 |
| Pressure (p.s.i.g.) | 2–10 | 2–10 | 2–10 | 2–10 |
| Fluidized bed conditions: | | | | |
| Bed temperature (° F.) | 250–500 | 240–400 | 420–430 | 320–360 |
| Residence time (hours) | 5–30 | 5–20 | 20–30 | 10–16 | coal feed and oxidized coal ammoniated with C. P. ammonium hydroxide were also analyzed for nitrogen, with the following results:

| | % Nitrogen |
|---|---|
| Oxidized coal, no ammoniation | 1.76 |
| Oxidized coal, ammoniated in slurry with NH₄OH | 5.64 |
| Oxidized coal, ammoniated in slurry with off-gas from coal carbonization operation | 4.75 |

As will be evident, the amount of nitrogen which can be realized utilizing any particular coal will be primarily a function of the initial nitrogen content of the coal as related to the amount of said nitrogen which can be retained after the oxidation step, together with the amount of said initial nitrogen which can be evolved in the form of ammonia or other nitrogen-rich compounds during the carbonization step. The stoichiometry of this discovery is fortuitous when one considers that approximately 0.25 percent ammonia by weight is the usual recovery expectancy from the high-temperature carbonization of coals in the 1,500°–2,000° F. range. Using this 0.25 percent ammonia figure, it can be calculated that for each percentage point of nitrogen added to a ton of partially oxidized coal, five tons of the coal must be separately carbonized. This, fortunately, leaves a margin of available heat in the form of coke and/or char and gas resulting from the carbonization operation and which can be subsequently used to furnish the heat for partially oxidizing the coal and for other of the process operations requiring thermal input and power. Indeed, the obvious availability of coal for the application of this discovery assures an abundancy of heat in the form of either raw coal, partially oxidized coal, coke, char, or gas from the very materials used to produce the nitrogenous coal-base plant food and soil conditioner.

Figure 1:
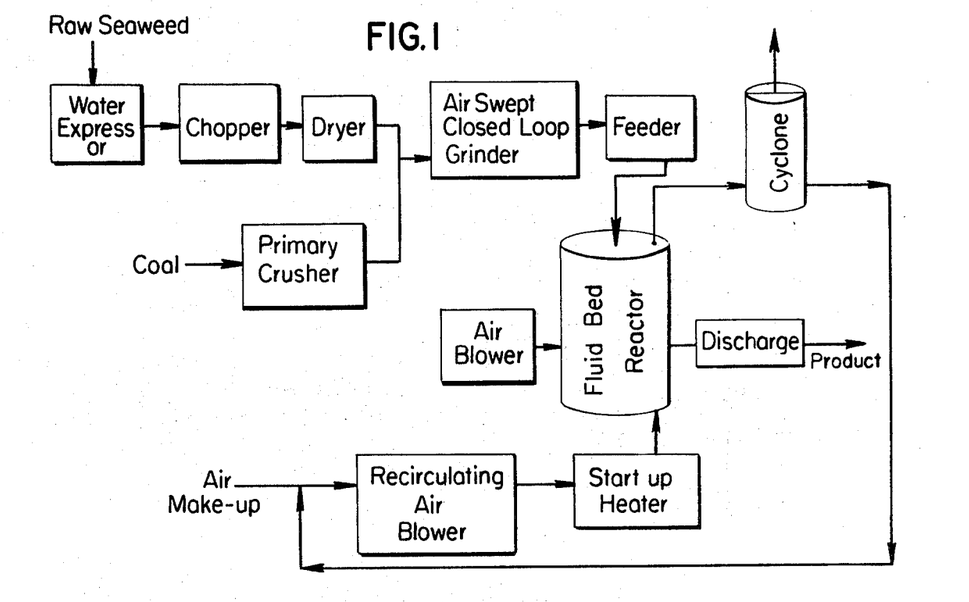
FIG. 1 is a schematic diagram illustrating the inventive process.

In a series of examples performed as illustrated in the schematic diagram of FIG. 1, process variables were studied. Three of these examples are set out below and the data obtained are shown graphically in FIG. 3.

EXAMPLES 3–5

Feed Material Data
Origin of Coal: Routt County, Colorado
Proximate Analysis:

| | | |
|---|---|---|
| H₂O | | 9.6% |
| Ash, dry basis | | 3.0% |
| Volatiles, dry basis | | 40.4% |
| Fixed Carbon, dry basis | | 56.0% |
| B.t.u./lb. | | 13,200 |

Operating Data

| Example Number | 3 | 4 | 5 |
|---|---|---|---|
| Particle size range, Tyler Mesh | −65+100 | −65+100 | −65+100 |
| Average temp. of bed, °F. | 400 | | 450 |
| Average temp. of air to reactor, °F. | 104 | 158 | 124 |
| Airflow to reactor, ft.³/min. | 0.65 | 0.65 | 0.62 |
| Coal feed to reactor, lb. | 10.0 | 10.0 | 10.0 |
| Coal recovered from reactor, lb. | 7.9 | 7.3 | 7.3 |
| Length of run, hrs. | 30.25 | 30.00 | 31.75 |
| Average heater inlet press, p.s.i.g. | 0.4 | 0.4 | 0.4 |
| Average reactor inlet press, p.s.i.g. | 0.3 | 0.3 | 0.3 |
| Average barometric press p.s.i.g. | 12.0 | 12.0 | 12.0 |
| Coal recovery, wt. % of feed | 79 | 73 | 73 |
| Total lb. air/lb. of coal feed | 8.6 | 8.5 | 8.6 |
| Maximum conversion, equiv. ml. 0.1N NaOH per gram of product | 27.0 | 34.2 | 28.0 |
| Conversion at end of run, equiv. ml. 0.1N NaOH per gram of product | 27.0 | 34.2 | 24.5 |

Operating conditions for example 3 were based on results of a previous run and the same conditions were used in run No. 4 and No. 5 with the exception that the operating bed temperature was raised from 400° to 430° F. in run No. 4 and to 450° F. in run No. 5.

The recorded temperature data for all three runs clearly indicates that the overall reaction of the coal sample is exothermic. The bed temperature averaged approx. 300° F. higher than the air temperature to the reactor in each of the three runs. With the exception of startup and the tag-end of the run, heat addition to the process was not required, and temperature control of the unit was accomplished by adjustment of the insulation surrounding the reactor.

Figure 3:
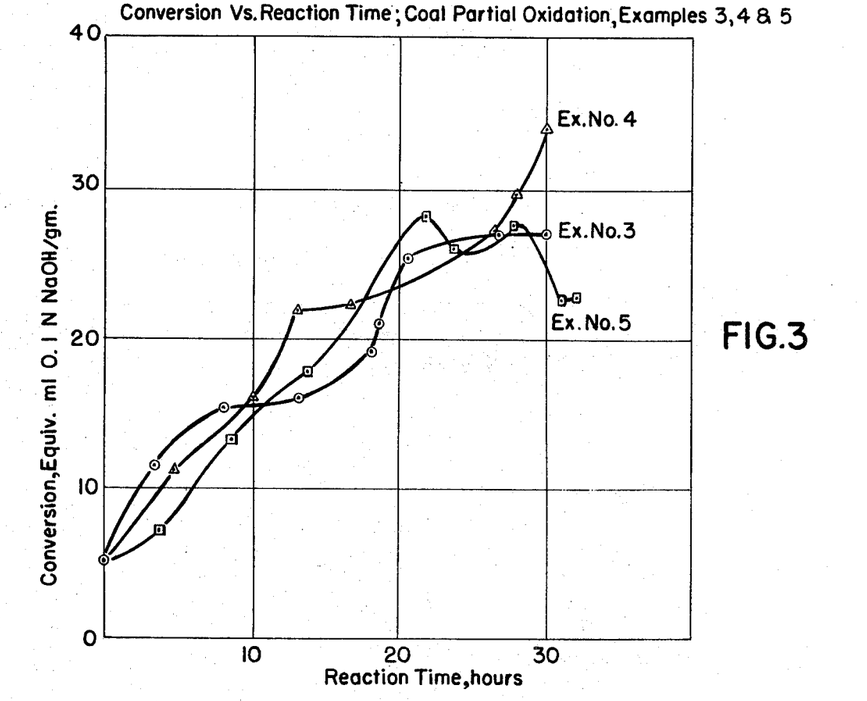
FIG. 3 is a graphic presentation of data showing the increase of acidity with time as coal is partially oxidized.

As shown graphically in FIG. 3, the data for the three runs indicates that reaction temperature is a critical parameter in the rate and degree of partial oxidation of the coal. In comparing the three runs, a reaction temperature of 430° F. resulted in a higher conversion than either reaction temperature of 400° F. or 450° F. However, operator difficulties in controlling the temperature during startup of the 450° F. run may have contributed to the lower conversion in this case. In the 450° F. run during the startup, bed temperatures exceeded 490° F. for over one-half hour. It is possible that during this one-half hour period enough reactive groups on the coal were either completely oxidized or altered in such a way as to reduce conversion during the remainder of the run.

This new fertilizer provides as nutrients not only nitrogen, phosphorus and potash, but also a wide range of trace elements. As is well known, the trace elements, or elements occurring in coal in small quantities, are held chemically rather tightly and are available for plant use only in a negligible quantity. In a like manner, the trace elements originally present in coals are converted to relatively insoluble oxides or lost during a coking process, hence, coke does not provide trace element nutrients to plants when it is ground to a powder, or granular form, and mixed into the soil.

The release of the trace elements copper and zinc is an example of how trace elements in general are converted into a more soluble and, therefore, more available form for plant nutrition. This discovery is illustrated by the following.

EXAMPLE 6

One-half-gram samples of raw coal and the finished fertilizer (made by reacting the oxidized coal with phosphate rock and potash with sulfuric acid) were first analyzed by standard colorimetric procedures for their copper and zinc content. Other 0.5 gram aliquots of each type of material were then leached with water and 5 percent citric acid for 12-hour periods. The remaining solids were again analyzed colorimetrically. The results were as follows:

TABLE III

| Material | Trace Element Content | |
|---|---|---|
| | Copper (p.p.m.) | Zinc (p.p.m.) |
| Coal (raw) | 20 | 30 |
| Finished Fertilizer | 20 | 50 |
| Finished fertilizer (12-hour water leach) | 10 | 20 |
| Finished fertilizer (12-hour acid leach) | 10 | 20 |

Approximately 50 percent of the zinc and copper were leachable from the finished fertilizer with both water and citric acid, hence, are available as nutrients to plants.

In contrast to both natural coal and coke, the fertilizer of this invention, during the oxidation step and subsequent chemical reactions, is converted into a much more reactive product in which the trace elements are held chemically with much less tenacity than in either coal or coke; hence they are much more readily available as plant nutrients.

It is well known that plant roots are surrounded with a water sheath having a high acid content or low pH. Plants obtain nutrients by exchanging hydrogen ions for the nutrient ions in solution or ions attached to a weathered mineral particle, such as a humus fragment. The plant, by sending out hydrogen ions to displace nutrient ions, "calls for" or "demands" the nutrient it needs. The organic complex holding the nutrient ions releases the nutrient ions "on call" from the plant root.

The fertilizer of this invention constitutes a fertilizer different in kind than the usual "water-soluble" fertilizers, because a large part of the nutrient ions come into solution only at an acid content, or pH below that normally prevailing in groundwater. In this way, the fertilizer decomposes or releases nutrients primarily as a result of the metabolic demand caused by plant activity and not just according to the amount of groundwater moving past the fertilizer particle. The amount of nitrogen released with time is illustrated by the following:

EXAMPLE 7

Five 1-gram samples of ammoniated, partially oxidized coal (containing 1.36 percent added nitrogen) were soaked with occasional stirring in solutions of various pH, (i.e. citric acid solutions and sodium hydroxide solutions) for various lengths of time. The solutions were then filtered and Kjeldahl nitrogen analysis were performed on each filtrate, with the following results:

TABLE IV

| Sample | pH of Solution | Time of Soaking | % of Added Nitrogen Transferred to Solution |
| --- | --- | --- | --- |
| 1 | 9.00 | 24 hours | 12% |
| 2 | 7.00 | 1 hr. | 0% |
| 3 | 7.00 | 8 hrs. | 0% |
| 4 | 7.00 | 24 hrs. | 15% |
| 5 | 5.00 | 8 hrs. | 0% |
| 6 | 5.00 | 24 hrs. | 17% |
| 7 | 5.00 | 34 hrs. | 20% |
| 8 | 3.00 | 8 hrs. | 0% |

The data of table IV above illustrates that the ammoniated, partially oxidized coal releases nitrogen values into the solution quickly at first and then very slowly and that the rate of dissolution tends to increase with decreasing pH or increasing acidity; the data, compared to the behavior of water-soluble fertilizer, indicates that rapid flooding, due to heavy rains or flushing due to irrigation, could remove most of the water-soluble fertilizer, whereas it would have little effect on the organic-base material. The data show that the amount of nitrogen released to a water solution decreases with increasing pH, i.e. increasing alkalinity. This behavior provides a unique and very important buffering action that is important to the nutrition of plants. Experiments, like that of example 7 above, show that the organic-base fertilizer releases the higher percentages of nitrogen at levels of highest acidity. This property of the fertilizer of this invention is the basis for referring to it as a "metabolic demand" fertilizer.

The following example illustrates the process of this invention using seaweed as a starting material.

EXAMPLE 8

| Operating Data | |
| --- | --- |
| Particle size range, Tyler Mesh | −65+100 |
| Average temp. of bed, °F. | 350 |
| Average temp. of air to reactor, °F. | 422 |
| Airflow to reactor, ft.³/min. | 1.2 |
| Seaweed feed to reactor, lb. | 11.0 |
| Seaweed recovered from reactor, lb. (including samples) | 7.4 |
| Length of run, hrs. | 21.0 |
| Average heater inlet press, p.s.i.g. | 0.60 |
| Average reactor inlet press, p.s.i.g. | 0.45 |
| Average barometric press, p.s.i. | 12.0 |
| Seaweed recovery, wt. % of feed | 67 |
| Total lb. air/lb. of feed | 10.0 |
| Maximum conversion, equiv. ml. 0.1N NaOH per gram of product | 26.8 |
| Conversion at end of run, equiv. ml. 0.1N NaOH per gram of product | 19.7 |

Figure 4:
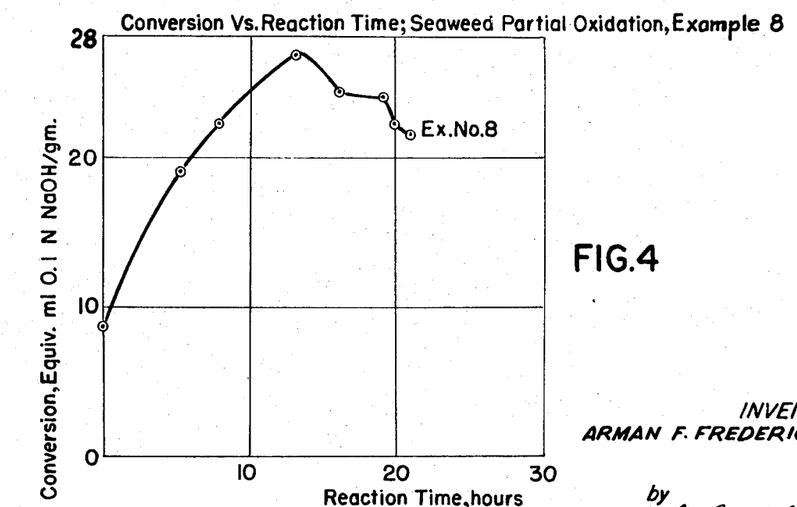
FIG. 4 is a graphic presentation, similar to FIG. 3, wherein seaweed is used as the starting material.

Neutralization analysis were performed on samples taken as the reaction proceeded to monitor conversion. A graph illustrating conversion as a function of reaction time is shown in FIG. 4.

The recorded temperature data for this run indicates that the overall reaction of the seaweed sample is not exothermic. The bed temperature averaged 70° F. lower than the air temperature to the reactor, and throughout the reaction period heat was added to the reactor walls by means of electric-resistance heating tapes in addition to the heat added to the air in flowing through the air heater. However, a tendency for rapid reaction in this run (apparently complete oxidation) occurred and reoccurred beginning after 16 hours of reaction. This reaction would start when the bed temperature exceeded 350°–355° F. and would necessitate use of every means available to cool the unit down.

It will be appreciated that, using the nitrogenous base of this invention, it should then be possible to produce a fertilizer containing varying amounts of nitrogen, phosphorus and potassium, by taking advantage of the chemical and physical reactivity of the nitrogenous base in the presence of phosphate rock, muriate of potash and sulfuric acid. For example, phosphate rock, muriate of potash and sulfuric acid in a water slurry of the nitrogenous base, have been reacted. The reactions expected to occur are as follows:

1. formation of phosphoric acid and calcium sulfate
   $Ca_3(PO_4)_2 + 3H_2SO_4 + 2H_2O \rightarrow 2H_3PO_4 + 3CaSO_4 \cdot 2H_2O$
2. formation of potassium phosphate and hydrogen chloride
   $3KCl + H_3 \rightarrow PO_4 \quad 3HCl + K_3PO_4$
3. formation of superphosphate and calcium sulfate
   $Ca_3(PO_4)_2 + H_2SO_4 + 5H_2O \quad Ca(H_2PO_4)_2 + 2CaSO_4 \cdot 2H_2O$ That these reactions did occur in the presence of the base to produce a mixed fertilizer not only rich in nitrogen, phosphate and potash, but also containing carbon and carbonaceous matter from the material and, hence, a diluent and dispersant for plant foods, as well as soil conditioner, may be noted from data, of which table V, below is typical.

TABLE V

| Ingredient | Total percent | Ingredient and percent |
| --- | --- | --- |
| Nitrogenous base (coal) | 50% | 4.7% nitrogen |
| Phosphate rock | 24% | 33.5% $P_2O_5$ |
| KCl | 8% | 63.0% $K_2O$ |
| $H_2SO_4$ | 18% | — |

Calculated nutrient analysis of final mixture after reaction

| | |
| --- | --- |
| $P_2O_5$ (total) | 8% |
| $K_2O$ (total) | 5% |
| N | 2% |
| Carbonaceous matter and mineral residue | Balance |

Analysis for Soluble Nutrients of Final Mixture After Reaction

| | Weight percent |
| --- | --- |
| Nitrogen (total) | 1.8% |
| Nitrogen water soluble | 1.6% |
| Water soluble $P_2O_5$ | 4.0% |
| Citrate soluble $P_2O_5$ | 0.3% |
| $K_2O$ water + citrate soluble) | 4.4% |

It may thus be concluded that a mixed fertilizer containing soluble nitrogen, $P_2O_5$ and $K_2O$ values resulted.

As an example of the ability of the partially oxidized seaweed product to serve as a fertilizer base, and absorb and fix additional nitrogen values—here ammonia—the following is given.

EXAMPLE 9

A sample of the partially oxidized product of example 8 was removed from the reactor at the point of maximum conversion, moistened and treated with gaseous ammonia. The resulting dried product was then analyzed for total nitrogen by the well known Kjeldahl method, as was the original dried seaweed. Results were as follows:

|  | % Total Nitrogen |
|---|---|
| Ammoniated product example 8, 13.0 hrs. | 3.76 |
| Feed to partial oxidation example 8 | 1.24 |
| Total nitrogen added to product | 2.52 |

From the foregoing example, it is obvious that the partial oxidation of the seaweed brought about reactions which rendered it possible for the partially oxidized product to practically double its capacity to hold fixed nitrogen.

EXAMPLE 10

An additional portion of the partially oxidized product as taken from the reactor during the operation cited in example 8, was mixed with naturally occurring phosphate rock and distilled water and agitated intermittently over a period of hours. Simultaneously, and under an identical situation with respect to degree of agitation and temperature, a second system consisting of the same naturally occurring phosphate rock and distilled water, was set up and agitated over a period of hours. These two systems were identical in every respect, except that the one system contained partially oxidized seaweed.

Samples were taken at intervals during the run and the carefully clarified solutions from these samples were analyzed for phosphorus by the phosphovanado molybdate method using UV spectroscopy. The phosphate rock used contained 33.5 percent $P_2O_5$ equivalent. The partially oxidized seaweed used had a neutralization (acid) number of 19.7 ml/o·1 N NaOH/gm. Results of this experiment were as follows:

| | Phos. rock plus water | | Phos. Rock plus Part. Oxid. Seaweed plus Water | |
|---|---|---|---|---|
| Time, hrs. | Gms. $P_2O_5$/ liter in solution | Percent $P_2O_5$ solubilized | Gms. $P_2O_5$/ liter in solution | Percent $P_2O_5$ solubilized |
| 0 | | | | |
| 0 | 0.0 | 0.0 | 0.0 | 0.0 |
| 89 | 0.015 | 0.2 | 0.208 | |
| 161 | 0.011 | 0.2 | 0.238 | |
| 403 | 0.030 | | 0.163 | 2.9 |
| 475 | 0.011 | 0.2 | 0.141 | 2.5 |

From the foregoing data, of which this sample is typical of many such experiments, it is obvious that the presence of partially oxidized seaweed enhances the release of phosphorus, a critical and necessary plant food, from its naturally occurring material.

EXAMPLE 11

As an example of the virtue of partially oxidized organic material in fertilizer mixes or as a direct additive to the soil, there is set out below an example of the ability of partially oxidized seaweed to fix ions of metals to thus bring such ions in or near plant roots so that the plant may obtain trace amounts of necessary metals by metabolic processes. It is well known to those skilled in the art that plantlife needs traces of metals in plant juices quite similar to the need for such trace metals as iron in the blood of animals. Among the elements which are believed to enhance the metabolism of plants is molybdenum.

For purposes of comparison, the experiments of which the following is typical, involved three systems, namely, a water slurry of a molybdenum salt, a water slurry of partially oxidized seaweed, and the water slurry of the seaweed and the molybdenum salt. Molybdenum disulfide and calcium molybdate were selected for use in the experiments on the basis of their insolubility in water. The systems were agitated over a period of hours and at intervals, small samples of the solution from each system were removed, clarified and analyzed for molybdenum by atomic adsorption spectroscopy.

Molybdenum Solubilization as a Function of Time (From $MoS_2$)

| Time hrs. | Part oxid. $MoS_2$ slurry p.p.m. Mo | seaweed slurry p.p.m. Mo | $MoS_2$-part oxid. seaweed slurry p.p.m. Mo |
|---|---|---|---|
| 0 | 0 | 0 | 0 |
| 24 | 24 | 5 | 7 |
| 48 | 24 | 5 | 7 |
| 96 | 24 | 5 | 7 |
| 178 | 27 | 3 | 6 |
| 336 | 31 | 6 | 11 |
| 504 | 33 | 7 | 12 |

Molybdenum Solubilization as a Function of Time (From $CaMoO_4$)

| Time hrs. | $CaMoO_4$ slurry p.p.m. Mo | Part. oxid. Seaweed slurry p.p.m. Mo | $CaMoO_4$-Part. oxid. seaweed slurry p.p.m. Mo |
|---|---|---|---|
| 0 | 0 | 0 | 0 |
| 89 | 6 | 2 | 2 |
| 161 | 6 | 2 | 4 |
| 281 | 6 | 2 | 4 |
| 403 | 6 | 1 | 4 |
| 575 | 6 | 2 | 3 |

From the foregoing, it is obvious that the partially oxidized seaweed adsorbed some molybdenum to thus fix the molybdenum in a fertilizer base, particularly an organic base, from which living roots should obtain trace amounts of this element by metabolic processes.

To demonstrate the ability of the particularly oxidized coal product to take up added nitrogen values, the following example is given.

EXAMPLE 12

The partially oxidized product from example No. 5 was ammoniated in accordance with the procedure set out in example 9 above. Both the feedstock to the partial oxidation run and the ammoniated product were analyzed for total nitrogen by the Kjeldahl method. The results were summarized below.

| Ammoniated Product Weight: | 7.9 lb. |
|---|---|
| Percent Nitrogen | 4.00% |
| Ammoniated Product | 4.00% |
| Feedstock to Partial Oxidation | 0.98% |
| Added to Product | 3.02% |

To illustrate the enhancement of the phosphate values of the fertilizers of this invention, the following series of examples are given.

EXAMPLE 13

Partially Oxidized Coal-Phosphate Rock

The partially oxidized product from example 3 was blended with phosphate rock. A weight ratio of partially oxidized coal to phosphate rock was used such that a 10 percent excess of coal was present over theoretical stoichiometric requirements to react with the BPL content of the phosphate rock. The data demonstrates that soluble phosphate values will result from reaction of the partially oxidized coal with phosphate rock in the presence of water.

Phosphate Solubilization as a Function of Time

| Time hrs. | Phosphate rock plus water g. P₂O₅/liter in solution | Phosphate rock plus partially oxidized coal plus water g. P₂O₅/liter in solution |
| --- | --- | --- |
| 0 | 0 | 0 |
| 24 | 0 | 0.18 |
| 166 | 0.2 | 0.56 |
| 214 | 0.2 | 0.70 |

EXAMPLE 15

The two slurries were set up with identical concentrations of phosphate rock and water and an amount of partially oxidized seaweed of example 8 which would give a stirrable slurry was added to one. The slurries had the following formulations:

| | | |
| --- | --- | --- |
| Phos. Rock (−100 mesh), g. | 10 | 10 |
| Part. Oxid. Seaweed (example 8) (−65+100 mesh), g. | — | 50 |
| Water (pH 6.80), g. | 600 | 600 |

The slurries were agitated intermittently for 8-hr. periods, at room temperature.

Samples were taken at intervals during the run following 16 hours of settling. The samples from the seaweed-phosphate rock slurry required up to 6 hours of centrifuging to separate suspended solids. The clarified samples were analyzed for phosphorus by the phosphovanado molybdate method using U.V. spectroscopy. The seaweed-phosphate rock solution samples required oxidation of organic material with nitric-perchloric acids prior to analysis.

The phosphate rock used contained 33.5% $P_2O_5$ as phosphate value. The partially oxidized seaweed used had a neutralization number of 19.7 ml. 0.1 N NaOH/gm.

RESULTS.—PHOSPHATE SOLUBILIZATION AS A FUNCTION OF TIME

| | Phos. rock plus water | | Phos. rock plus part. oxid. seaweed plus water | |
| --- | --- | --- | --- | --- |
| Time, hrs. | Gms. P₂O₅/ liter in solution | Percent P₂O₅ solubilized | Gms. P₂O₅/ liter in solution | Percent P₂O₅ solubilized |
| 0 | | | | |
| 0 | 0.0 | 0.0 | 0.0 | 0.0 |
| 89 | 0.015 | 0.2 | | |
| 161 | 0.011 | 0.2 | | |
| 403 | 0.030 | | 0.163 | 2.9 |
| 475 | 0.011 | 0.2 | 0.141 | 2.5 |

EXAMPLE 16

Three runs were made for purposes of comparison. In the first $Fe_2O_3$ powder was slurried with water. In the second, partially oxidized seaweed was slurried with water. In the third $Fe_2O_3$ and partially oxidized seaweed were slurried together with water.

At intervals during the runs small samples of solution were removed from each container after the slurry had settled. The solution from the $Fe_2O_3$ slurry could be easily filtered, but the solutions from the seaweed slurries required up to 6 hours of centrifuging to remove suspended solids (which testing proved would give erroneously high results in the subsequent analysis by atomic adsorption spectroscopy). Additional testing indicated that the presence of soluble organic material in the clarified seaweed solutions did not affect the atomic adsorption analysis. This testing involved oxidation of the organic material in a solution sample followed by comparison analysis of oxidized and unoxidized solution.

The partially oxidized seaweed used was a sample that had a neutralization number of 14.2 ml. 0.1 N NaOH/gm.

| | Oxide slurry | Part. oxid. seaweed slurry | Part. oxid. seaweed oxide slurry |
| --- | --- | --- | --- |
| Slurry proportions, gms.: | | | |
| C.P. Fe₂O₃ (powered) | 20 | | 10 |
| Seaweed (−65+100 mesh) | | 20 | 100 |
| Water | 400 | 80 | 400 |
| Operating conditions,¹ slurry temp., °C. | 25–30 | 25–30 | 25–30 |

¹ Intermittent agitation for 8-hr. periods, except weekends.

IRON SOLUBILIZATION AS A FUNCTION OF TIME

| | P.p.m. Fe | | |
| --- | --- | --- | --- |
| Time, hrs. | Fe₂O₃ slurry | Part oxide seaweed slurry | Part oxide seaweed Fe₂O₃ slurry |
| 0 | 0 | 0 | 0 |
| 24 | 0.3 | 7 | 8 |
| 48 | 0.3 | 7 | 13 |
| 178 | 0.3 | 7 | 19 |

EXAMPLE 17

For each system, three runs were made for purposes of comparison. The three runs included a molybdenum salt slurry blank, a seaweed slurry blank, and a seaweed-molybdenum salt mixture in slurry. Molybdenum disulfide and calcium molybdate were selected for use in the experiments on the basis of their insolubility in water. The $MoS_2$ used was a Climax product of 99 percent purity. The $CaMoO_4$ used was prepared from C. P. calcium acetate and ammonium molybdate in a procedure involving precipitation, filtration, and water washing.

At intervals during the runs small samples of solutions were removed from the containers and centrifuged to remove suspended material (up to 6 hours of centrifuging were required in the case of samples from the seaweed slurries). The clarified samples were then analyzed for molybdenum by atomic adsorption spectroscopy.

Partially oxidized seaweed with a neutralization number of 14.5 ml. 0.1 N NaOH/gm. was used in the experiment involving molybdenum disulfide, and partially oxidized seaweed from example 8 with a neutralization number of 19.7 ml. 0.1 N NaOH/gm. was used in the experiment involving calcium molybdate.

| | MoS₂ slurry | Part. oxid. seaweed slurry | MoS₂-part. oxid. seaweed slurry |
| --- | --- | --- | --- |
| Slurry proportions, gms.: | | | |
| MoS₂ | 10 | | 10 |
| Part. oxid. seaweed | | 20 | 100 |
| Water | 400 | 80 | 400 |
| Operating conditions,¹ slurry temp., °C. | 25–30 | 25–30 | 25–30 |

¹ Intermittent agitation for 8-hr. periods, except for weekends.

MOLYBDENUM SOLUBILIZATION AS A FUNCTION OF TIME (FROM MoS₂)

| | MoS₂ slurry | Part. oxid. seaweed slurry | MoS₂-part. oxid. seaweed slurry |
| --- | --- | --- | --- |
| | P.p.m. Mo | | |
| Time, hours: | | | |
| 0 | 0 | 0 | 0 |
| 24 | 24 | 5 | 7 |
| 48 | 24 | 5 | 7 |
| 96 | 24 | 5 | 7 |
| 178 | 27 | 3 | 6 |
| 336 | 31 | 6 | 11 |
| 504 | 33 | 7 | 12 |

| Slurry proportions (gms.) | | | |
| --- | --- | --- | --- |
| CaMoO₄ | 5 | | 5 |
| Part. oxid. seaweed | | 50 | 50 |
| Water | 600 | 600 | 600 |

| Operating conditions ¹ | | | |
| --- | --- | --- | --- |
| Slurry temp., °C. | 25–30 | 25–30 | 25–30 |

¹ Intermittent agitation for 8-hr. periods except for weekends.

MOLYBDENUM SOLUBILIZATION AS A FUNCTION OF TIME (FROM CaMoO₄)

| Time, hour | CaMoO₄ slurry | Seaweed slurry | CaMoO₄-part. oxid. seaweed slurry |
|---|---|---|---|
| | P.p.m. Mo | | |
| 0 | 0 | 0 | 0 |
| 89 | 6 | 2 | 2 |
| 161 | 6 | 2 | 4 |
| 281 | 6 | 2 | 4 |
| 403 | 6 | 1 | 4 |

EXAMPLE 18

Three runs were made for purposes of comparison. These runs included a calcium molybdate slurry blank, a partially oxidized coal slurry blank, and a mixture of calcium molybdate and partially oxidized coal in slurry.

At intervals during the runs small samples of solution were removed and centrifuged to remove suspended solids. The clarified samples were then analyzed for molybdenum by atomic adsorption spectroscopy.

Partially oxidized coal with a neutralization number of 32.4 ml. 0.1 N NaOH/gm. and calcium molybdate prepared from C. P. calcium acetate and ammonium molybdate by crystallization were used in the experiment.

| | CaMoO₄ slurry | Part. oxid. coal slurry | CaMoO₄-part. oxid. coal slurry |
|---|---|---|---|
| Slurry proportions, gms.: | | | |
| CaMoO₄ | 5 | | 5 |
| Part. oxid. coal | | 50 | 50 |
| Water | 600 | 600 | 600 |
| Operating conditions,¹ slurry temp., °C | 25-30 | 25-30 | 25-30 |

¹ Intermittent agitation for 8-hr. periods, except for weekends.

MOLYBDENUM SOLUBILIZATION AS A FUNCTION OF TIME

| | P.p.m. Mo | | |
|---|---|---|---|
| Time, hrs. | CaMoO₄ slurry | Part oxid. coal slurry | CaMoO₄-part. oxid. coal slurry |
| 0 | 0 | 0 | 0 |
| 89 | 6 | 2 | 28 |
| 161 | 6 | 0.5 | 65 |
| 281 | 6 | 0.6 | 104 |
| 403 | 6 | 0.5 | 250 |
| 475 | 6 | 0.5 | 278 |

The partially oxidized coal of this invention is not to be confused with activated carbon. The difference between the two materials can be shown by a comparison of process temperatures and a comparison of acidity. In the manufacture of activated carbon, process temperatures range from 500° F. in the initial stages to 1,500° F. in the final stages (C. L. Mantell, Industrial Carbon, D. Van Nostrand Co., 1946, pp. 118, 165–166). In the partial-oxidation process to form humic acid material from coal, process temperatures below 500° F. are generally employed. The much higher acidity of the partially oxidized coal over activated carbon is illustrated by data, of which the following data is typical:

TABLE VI

| Material | Sample Wt. (grams) | Equiv. ml. 0.1 N NaOH |
|---|---|---|
| Activated Carbon (NuChar WA) | 1.00 | 3.7 |
| Unoxidized Coal (high volatile bituminous) | 1.00 | 11.0 |
| Partially Oxidized Coal (high volatile bituminous) | 1.00 | 39.8 |

The small amount of sodium hydroxide required to neutralize activated carbon indicates that it is only slightly acid in character. In contrast, the partially oxidized coal is over 10 times as acid in character as the activated carbon.

It is important to note that very low grade coals, lignites and peat that may have marginal value when considered only as fuels make ideal raw materials for this process as well as the higher grade materials. The lower rank coals and lignites often have a higher nitrogen content than higher rank coals and the higher the initial nitrogen content of the raw materials, the less is required to produce a product having a final specified nitrogen content, shown as follows:

TABLE VII

Nitrogen Content of Solid Fuels

| | Percent Nitrogen |
|---|---|
| Peat | 0.7-3.4 |
| Brown coal | 0.4-2.5 |
| Bituminous coal | 0.6-2.8 |
| Anthracite | 0.2-1.5 |

Coals with a relatively high sulfur content that makes them less desirable for use as fuels can also be used in this process because the sulfur compounds and gases are not deleterious substances either when the oxidized coal is used as an absorbent alone, or is later reacted with other materials to form a balanced fertilizer.

The fertilizers of this invention are nonhygroscopic solids. Because they do not readily pickup water from the air, they can be shipped in the bulk state, as bagged granules or as palletized briquettes.

The fertilizers can be spread mechanically, or blown onto the soil as granules or a powder; by mixing with water an emulsion can be prepared and the fertilizer can be sprayed onto the soil. An emulsion can also be prepared by mixing the powdered fertilizers with petroleum or an asphalt base in which form it can be sprayed onto the soil surface producing a soil covering that inhibits the loss of moisture by evaporation and retains the bulk of the fertilizer near the surface where it is needed when the plants are just beginning to root.

The concentration of fertilizer used is not critical, the amount being used limited only to the total requirements of the plants and not to any consideration of soil "burning" as is the case with soluble fertilizers.

To summarize briefly, this invention relates to a novel nitrogenous metabolic demand fertilizer and fertilizer base comprising a nitrogen containing organic material which has been partially oxidized under controlled conditions of time, temperature and oxidizing gas flow in a fluidized bed reaction zone.

The process results in a fertilizer product which may be enhanced in nutrient values by reaction with nitrogen, phosphorus, potassium, sulfate containing materials. In addition, vital trace elements such as molybdenum, iron, copper, zinc, manganese, cobalt, boron, iodine, sulfur, magnesium and the like, may be added to the fertilizer base.

Starting materials for these novel fertilizers may be selected from a group of naturally occurring organic materials including, brown coal, bituminous coal, anthracite coal, asphaltenes, peat moss, seaweed, plant tops, grasses, etc.

What is claimed is:

1. A process for the production of a metabolic demand fertilizer material which comprises the steps of:

Partially oxidizing a finely divided seaweed in a fluidized bed thereof at a temperature below that which will effect complete oxidation, between about 240° F. to 400° F. for from 5 to 20 hours by passing therethrough, thereby fluidizing the same, an oxidizing gas at a temperature of from about 300° to 450° F. and at a pressure of from about 2 to 10 pounds per square inch gauge;

Neutralizing the partially oxidized seaweed with ammonia in the presence of moisture; and drying the product.

2. A process for the production of a metabolic demand fertilizer material which comprises the steps of partially oxidizing a finely divided seaweed in a fluidized bed thereof at a temperature below that which will effect complete oxidation, between 320° to 360° F. for from 10 to 16 hours by passing therethrough, thereby fluidizing the same, an oxidizing gas at a temperature of from 400° to 450° F. and at a pressure of from 2 to 10 pounds per square inch gauge; neutralizing the partially oxidized seaweed with ammonia in the presence of moisture; and drying the product.

3. The process of claim 2 wherein said ammonia is in the form of gaseous ammonia.

4. A process of claim 2 wherein said ammonia is a slurry of aqueous ammonia.